DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 19

T896,018
SCUFF-RESISTANT URETHANE COATED FABRICS
Bernard Taub, Williamsville, N.Y., assignor to Allied Chemical Corporation, New York, N.Y.
Filed Feb. 1, 1971, Ser. No. 111,654
Int. Cl. B32b *27/40*
U.S. Cl. 117—76 T
No Drawing. 16 Pages Specification

Novel urethane coated fabrics of enhanced resistance to scuffing and abrasion are prepared by applying to a urethane-coated fabric a top coating consisting of a flexible heat-cured silicone polymer. The sequence of bonding the coating to the fabric is not critical. An adhesive may be applied directly to the fabric and the urethane coating may be subsequently applied thereto and cured by heating with preliminary use of release paper for the coating. Or, the urethane-coating composition may be applied directly to the fabric without prior use of adhesive or release paper. Heat-curable silicone resin polymers are known articles of commerce and are used in the form of aqueous emulsions or solutions. They typically include solutions of organosilioxanes, organosilanes and siloxane condensation catalysts. Suitable urethane coating compositions are known in the art and are preferably organic solvent solutions of fully reacted polyurethane urea resins. The coating compositions may be pigmented with a variety of inorganic or organic pigments such as titanium dioxide, phthalocyanine green, phthalocyanine blue, carbon black, bone black, chrome yellow, cadmium red and toluidine red. Fabrics suitable for coating include linen, nylon, cotton, rayon, silk, wool, polyester, polyacrylonitrile, modacrylic, or mixtures thereof. The novel urethane coated fabrics are particularly useful for automotive and furniture upholstery.